United States Patent
Erbes et al.

(10) Patent No.: US 6,343,107 B1
(45) Date of Patent: Jan. 29, 2002

(54) SHROUD REPAIR APPARATUS

(75) Inventors: John G. Erbes, Mt. View; Sampath Ranganath; Barry H. Koepke, both of San Jose, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/496,112

(22) Filed: Feb. 1, 2000

(51) Int. Cl.$^7$ .............................................. G21C 19/00
(52) U.S. Cl. ....................................... 376/302; 376/260
(58) Field of Search ............................... 376/302, 304, 376/287, 260, 285

(56) References Cited

U.S. PATENT DOCUMENTS

| | | | |
|---|---|---|---|
| 5,402,570 A | * 4/1995 | Weems et al. | 376/302 |
| 5,538,381 A | * 7/1996 | Erbes | 376/302 |
| 5,621,778 A | 4/1997 | Erbes | |
| 5,675,619 A | 10/1997 | Erbes et al. | |
| 5,742,653 A | 4/1998 | Erbes et al. | |

* cited by examiner

*Primary Examiner*—Harvey E. Behrend
(74) *Attorney, Agent, or Firm*—Armstrong Teasdale LLP

(57) ABSTRACT

A repair apparatus for a shroud in a nuclear reactor pressure vessel is described. The repair apparatus includes an upper stabilizer assembly, a lower stabilizer assembly, and a tie rod configured to extend between and to couple to the upper and lower stabilizer assemblies. The upper stabilizer includes a stabilizer block and an upper stabilizer wedge slidably coupled to the upper stabilizer block. The upper stabilizer block is configured to couple to a shroud lug. The upper stabilizer wedge includes an integral leaf spring portion formed by a slot in the wedge and is configured to engage the side wall of the reactor pressure vessel. The lower stabilizer assembly includes a stabilizer block and a lower stabilizer wedge slidably coupled to the lower stabilizer block. The lower stabilizer block is configured to engage the shroud. A horizontal stabilizing spring is attached to the wedge and is configured to engage the side wall of the reactor pressure vessel. The tie rod is threaded at each end. One end threadedly engages a tie rod opening in the bottom stabilizer block. The other end is received by the upper stabilizer block and is secured by a tie rod nut.

20 Claims, 9 Drawing Sheets

SHROUD REPAIR APPARATUS

BACKGROUND OF THE INVENTION

This invention relates generally to maintenance and repair of nuclear reactors, and more particularly, to the repair of the fuel core shroud of a boiling water nuclear reactor.

A reactor pressure vessel (RPV) of a boiling water reactor (BWR) typically has a generally cylindrical shape and is closed at both ends, e.g., by a bottom head and a removable top head. A top guide, sometimes referred to as a grid is spaced above a core plate within the RPV. A core shroud, or shroud, surrounds the core plate and is supported by a shroud support structure. The core shroud is a reactor coolant flow partition and structural support for the core components. Particularly, the shroud has a generally cylindrical shape and surrounds both the core plate and the top guide. The top guide includes a plurality of openings, and fuel bundles are inserted through the openings and are supported by the core plate.

The shroud, due to its large size, is formed by welding a plurality of stainless steel cylindrical sections together. Specifically, respective ends of adjacent shroud sections are joined with a circumferential weld. During operation of the reactor, the circumferential weld joints may experience stress corrosion cracking (SCC) in the weld heat affected zones which can diminish the structural integrity of the shroud. In particular, lateral seismic/dynamic loading could cause relative displacements at cracked weld locations, which could produce large core flow leakage and misalignment of the core that could prevent control rod insertion and a safe shutdown.

The shroud, containing welds which may experience SCC, is located in a remote, confined location below 60 feet of water and is accessible only during refueling outages. Because the loss of power production during outages is a significant cost, it is desirable to minimize the required duration of any repair operations, particularly, shroud weld repair operations.

BRIEF SUMMARY OF THE INVENTION

A repair apparatus for a shroud in a nuclear reactor pressure vessel that does not require any installation machining of existing reactor components and is quickly installed in the reactor pressure vessel. In an exemplary embodiment, the repair apparatus includes an upper stabilizer assembly, a lower stabilizer assembly, and a tie rod configured to extend between and to couple to the upper and lower stabilizer assemblies.

The upper stabilizer includes a stabilizer block and an upper stabilizer wedge slidably coupled to the upper stabilizer block. The upper stabilizer block is configured to couple to a shroud lug pair. The upper stabilizer assembly further includes a jack bolt extending through a jack bolt opening in the upper stabilizer wedge and threadedly engaging a jack bolt opening in the upper stabilizer block. The upper stabilizer wedge includes a ratchet lock spring configured to engage the jack bolt to maintain the tightness of the jack bolt. The upper stabilizer wedge further includes an integral leaf spring portion formed by a slot in the wedge and configured to engage the side wall of the reactor pressure vessel. The leaf spring portion provides flexibility for tightening the jack bolt at assembly and absorbing operating variations in the annulus width, while also limiting radial and friction interaction loads for various reactor operating conditions.

The lower stabilizer assembly includes a stabilizer block and a lower stabilizer wedge slidably coupled to the lower stabilizer block. The lower stabilizer block is configured to engage the shroud. The lower stabilizer assembly also includes a jack bolt extending through a jack bolt opening in the lower stabilizer wedge and threadedly engaging a jack bolt opening in the lower stabilizer block. Also, the lower stabilizer wedge includes a ratchet lock spring configured to engage the jack bolt to maintain the tightness of the jack bolt. A horizontal stabilizing spring is attached to the surface of the wedge that engages the reactor pressure vessel side wall. The horizontal stabilizing spring is configured to engage the side wall of the reactor pressure vessel.

The tie rod is threaded at each end. One end threadedly engages a tie rod opening in the bottom stabilizer block. The other end is received by the upper stabilizer block and is secured by a tie rod nut. The tie rod nut reacts the tie rod load against the upper stabilizer block. In one embodiment, the tie rod is fabricated from Ni—Cr—Fe alloy X-750 steel. Tie rod preload increases at operating temperatures due to the differential expansion between the X-750 tie rod and the stainless steel shroud. With an X-750 tie rod, more thermal differential contraction of the tie rod is produced than needed for the desired operating preload. To compensate, a belleville spring washer is positioned between the tie rod nut and the upper stabilizer block. The spring washer deflects only slightly with the low mechanical installation preload, for example, 5000 pounds, but compresses additionally to seat flat against the upper stabilizer block under full thermal preload.

A limit stop is attached near the upper end of the tie rod. The limit stop includes two shear pins which fit mating holes in the bottom of the upper stabilizer block, providing a torque restraint for tightening the tie rod nut as well as a pinned anti-vibration connection to support the tie rod during operation.

The outer surface of the tie rod includes a plurality of longitudinal grooves spaced around the tie rod periphery to limit flow induced vibration of the tie rod. The grooves reduce the vortex shedding frequency below the natural vibration frequency of the tie rod, so resonant excitation of the tie rod does not occur.

The above described shroud repair apparatus is quickly and easily installed in a reactor pressure vessel because it does not require any installation machining of existing reactor components. The lower stabilizer assembly and tie rod are pre-assembled with the tie rod threaded into the lower stabilizer block. This assembly is lowered into position in the annulus with the lower stabilizer engaging the protruding core plate support ledge. The lower stabilizer wedge is then lowered into place on the lower stabilizer block and adjusted by tightening the jack bolt. The ratchet lock spring prevents the jack bolt from loosening.

The upper stabilizer assembly is lowered into position in the annulus area between the shroud and the reactor pressure vessel outer wall, engaging the tie rod through the center hole in the upper stabilizer block. A lug opening at the top of the upper stabilizer block is then engaged onto a shroud lug pair. The tie rod nut is then lowered in place and tightened to the tie rod which causes the lower stabilizer block to seat against the bottom surface of the shroud core plate support ledge. A ratchet lock spring prevents the tie rod nut from loosening during reactor operation. The upper stabilizer wedge is then lowered into position and adjusted by tightening the jack bolt. The ratchet lock spring prevents the jack bolt from loosening during reactor operation. Typically four repair apparatus, equally spaced around the shroud, are installed in a reactor pressure vessel to repair cracked shroud welds.

The above described shroud repair apparatus does not require any installation machining of existing reactor components prior to installation, and therefore is quickly and easily installed in the reactor pressure vessel. The repair apparatus provides lateral support for the shroud and imparts a clamping force to the shroud to maintain shroud joint integrity and overcome the effects of any stress corrosion cracking in the circumferential shroud welds.

DETAILED DESCRIPTION OF THE INVENTION

Figure 1:
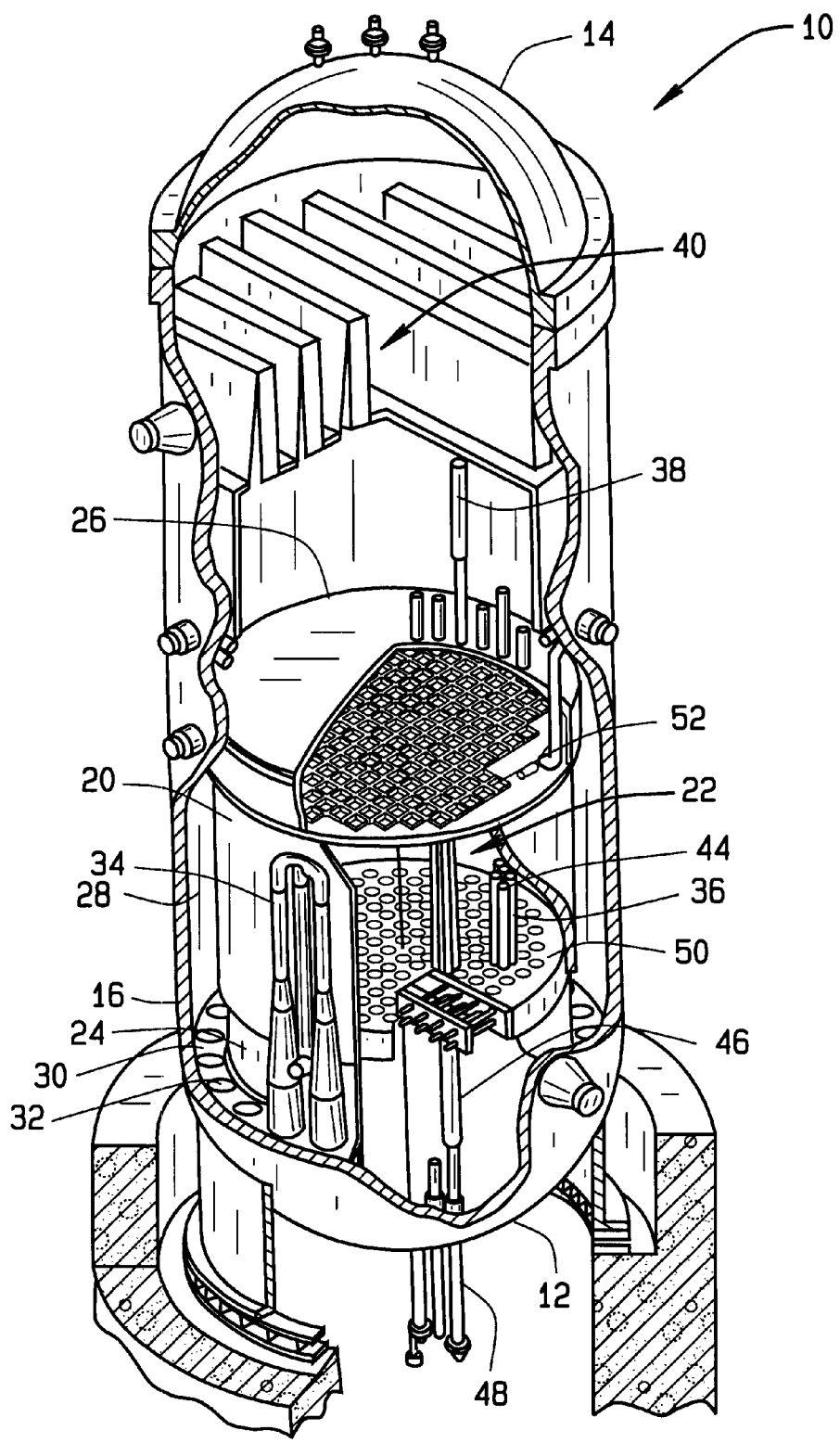
FIG. 1 is a sectional view, with parts cut away, of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump assembly 34. Jet pump assemblies 34 are circumferentially distributed around core shroud 20.

Heat is generated within core 22, which includes fuel bundles 36 of fissionable material. Water circulated up through core 22 is at least partially converted to steam. Steam separators 38 separates steam from water, which is recirculated. Residual water is removed from the steam by steam dryers 40. The steam exits RPV 10 through a steam outlet 42 near vessel top head 14.

The amount of heat generated in core 22 is regulated by inserting and withdrawing control rods 44 of neutron absorbing material, such as for example, hafnium. To the extent that control rod 44 is inserted into fuel bundle 36, it absorbs neutrons that would otherwise be available to promote the chain reaction which generates heat in core 22. Control rod guide tubes 46 maintain the vertical motion of control rods 44 during insertion and withdrawal. Control rod drives 48 effect the insertion and withdrawal of control rods 44. Control rod drives 48 extend through bottom head 12.

Fuel bundles 36 are aligned by a core plate 50 located at the base of core 22. A top guide 52 aligns fuel bundles 36 as they are lowered into core 22. Core plate 50 and top guide 52 are supported by core shroud 20.

Figure 2:
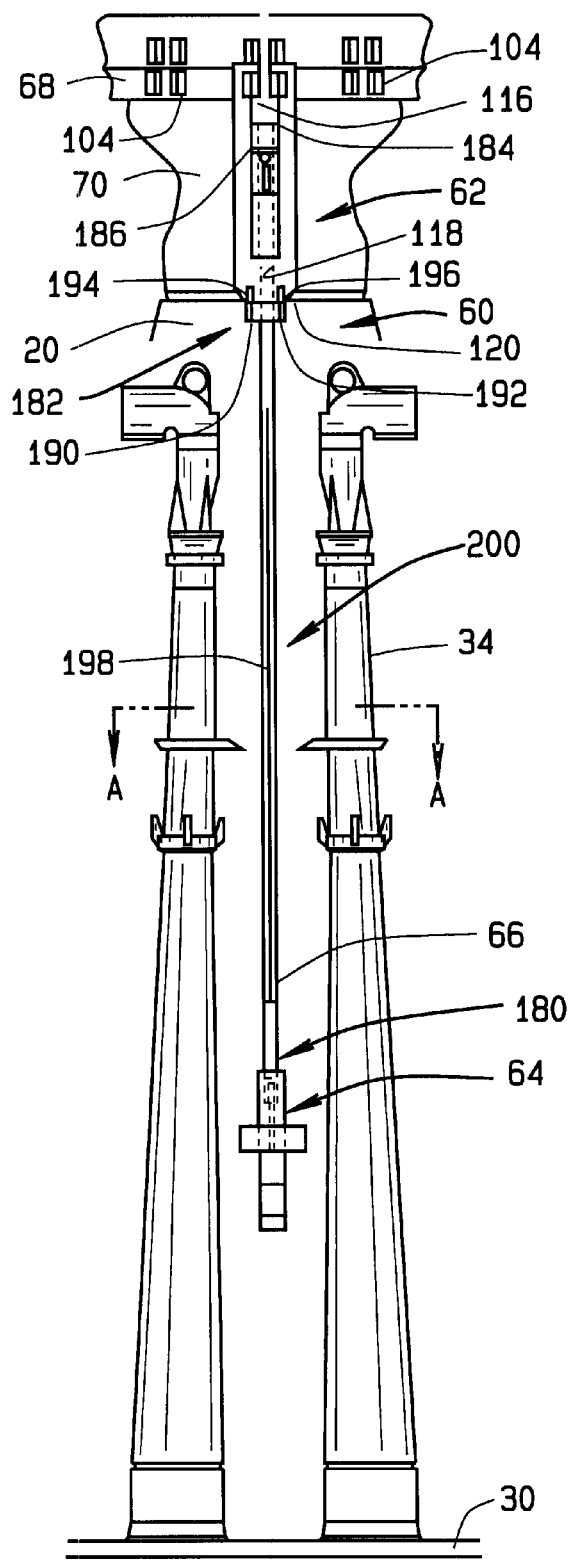
FIG. 2 is a front view of a shroud repair apparatus in accordance with an embodiment of the present invention.
Figure 3:
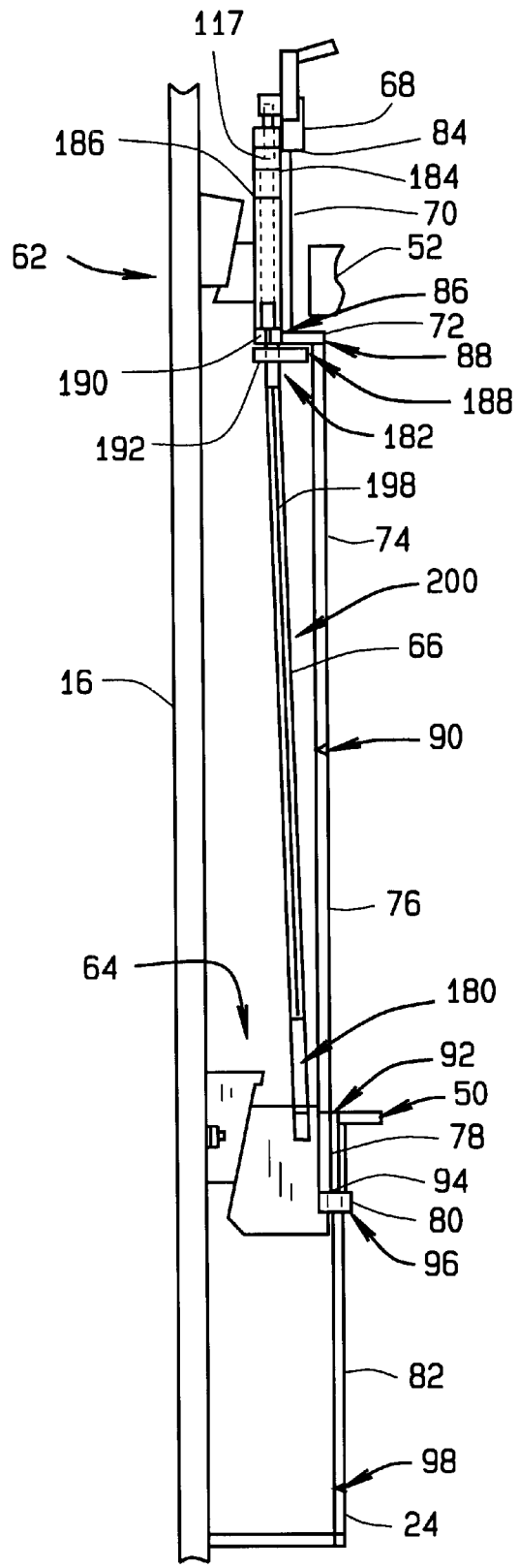
FIG. 3 is a side view of the shroud repair apparatus shown in FIG. 2.

FIG. 2 shows a front view of a shroud repair apparatus 60, in accordance with an exemplary embodiment of the present invention, mounted on shroud 20 of RPV 10. FIG. 3 shows a side view of shroud repair apparatus 60. Referring to FIGS. 2 and 3, shroud repair apparatus 60 includes an upper stabilizer assembly 62, a lower stabilizer assembly 64, and a tie rod 66 extending between upper and lower stabilizer assemblies 62 and 64.

Shroud repair apparatus 60 is attached to shroud 20 to provide positive positioning of all segments of shroud 20 and fuel bundles 36. In one exemplary embodiment, four shroud repair apparatus 60 are attached to shroud 20 and are circumferentially distributed around shroud 20. In other embodiments, more than four or less than four shroud repair apparatus can be used to repair shroud 20 and overcome the problems associated with shroud weld stress corrosion cracking.

Shroud 20 includes a shroud head flange 68, an upper shroud section 70, a top guide support 72, mid shroud sections 74, 76, and 78, a core plate support 80, and a lower shroud section 82. Circumferential welds 84, 86, 88, 90, 92, 94, and 96 couple the shroud elements together. A circumferential weld 98 attaches lower shroud section to shroud support 24. Welds 84, 86, 88, 90, 92, 94, 96, and 98 are sometimes referred to as welds H1, H2, H3, H4, H5, H6A, H6B, and H7 respectively.

It has been generally observed that the shroud welds nearest to reactor core 22, for example welds 86, 88, 90, 92, and 94, are more likely to experience stress corrosion cracking. Shroud repair apparatus 60 is effective in providing positive positioning of all segments of shroud 20 affected by failures in welds 86, 88, 90, 92, and/or 94.

Figure 4:
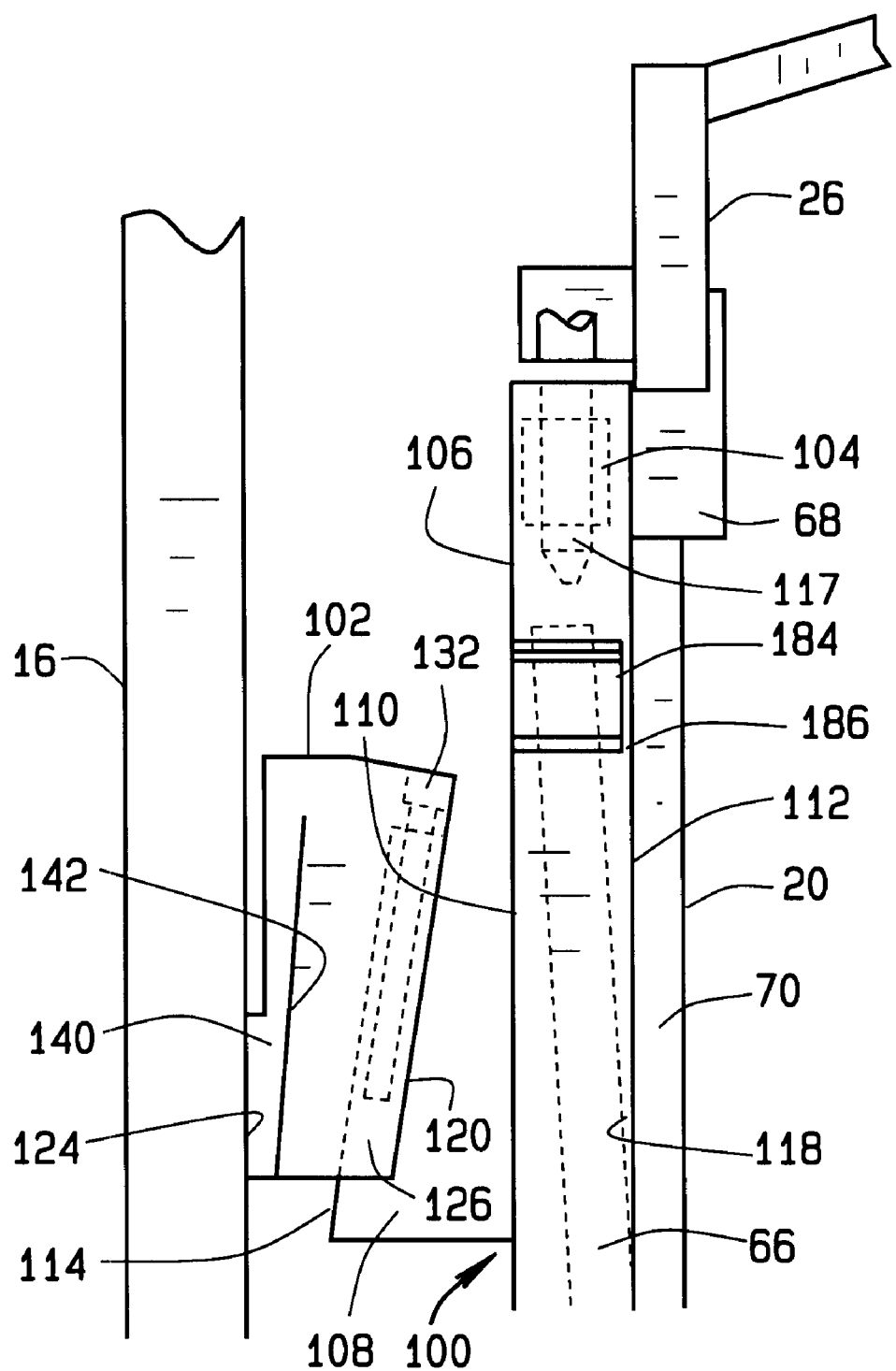
FIG. 4 is an enlarged side view of an upper portion of the shroud repair apparatus shown in FIG. 2.
Figure 5:
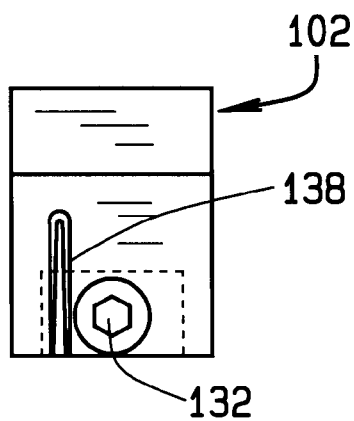
FIG. 5 is a top view of the upper stabilizer wedge assembly of the shroud repair apparatus shown in FIG. 2.
Figure 6:
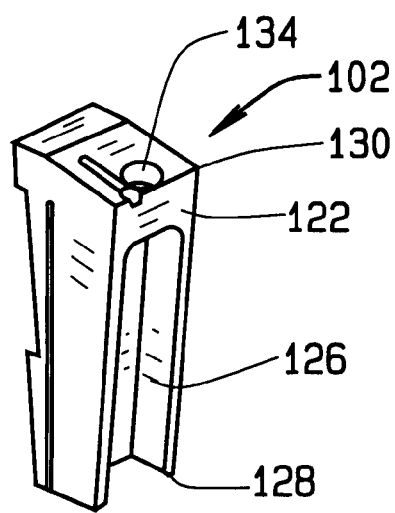
FIG. 6 is a perspective view of the upper stabilizer wedge assembly of the shroud repair apparatus shown in FIG. 2.

Referring also to FIGS. 4, 5, and 6, upper stabilizer assembly 62 includes an upper stabilizer block 100 and an upper stabilizer wedge 102 slidably coupled to upper stabilizer block 100. Upper stabilizer block 100 is configured to couple to shroud lugs 104 located circumferentially around shroud head flange 68. Particularly, upper stabilizer block 100 includes a first portion 106 and a second portion 108 extending from a first side 110 of first portion 106. A second side 112 of upper stabilizer block first portion 106 is configured to engage shroud 20. Specifically, second side 112 is configured to engage shroud head flange 68, upper shroud section 70, and top guide support 72. Upper stabilizer second portion 108 is configured to engage wedge 102. Particularly, second portion is tapered to provide a wedge engagement surface 114.

Upper stabilizer first portion 106 includes a slotted opening 116 sized to receive a pair of shroud lugs 104. Additionally, slotted opening 116 accommodates the subsequent installation of an existing shroud T-bolt 117, which is used to secure shroud head 26 to shroud 20. First portion 106 also includes a bore 118 extending from a first end 120 to slotted opening 116. Bore 118 is sized to receive tie rod 66.

Upper stabilizer wedge 102 includes a tapered first side 122 and an opposing second side 124. First side 122 includes a channel 126 sized to receive wedge engagement surface 114 of upper stabilizer block second portion 108. Channel 126 extends from a first end 128 of wedge 102 at least partially towards a second end 130 of wedge 102.

Upper stabilizer assembly 62 further includes a jack bolt 132 extending through a jack bolt opening 134 in upper stabilizer wedge 102 and threadedly engaging a jack bolt opening 136 in upper stabilizer block second portion 108. Upper stabilizer wedge jack bolt opening 134 extends from second end 130 of wedge 102 into channel 126. Upper stabilizer wedge 102 also includes a ratchet lock spring 138 configured to engage jack bolt 132 to maintain the tightness of jack bolt 132. Channel 126 maintains alignment of upper stabilizer wedge 102 and permits vertical position adjustment of wedge 102 by jack bolt 132. This adjustment along wedge tapered side 122 is used to install wedge 102 with a specified tight fit between upper stabilizer block 100 and pressure vessel side wall 16 while accommodating for any variations in the width of annulus 28.

Upper stabilizer wedge 102 further includes an integral leaf spring portion 140 formed by a slot 142 in wedge 102. Leaf spring portion 140 is configured to engage side wall 16 of reactor pressure vessel 10. Leaf spring portion 140 provides flexibility for tightening jack bolt 132 at assembly and absorbing operating variations in the width of annulus 28, while also limiting radial and friction interaction loads for various reactor operating conditions.

Figure 7:
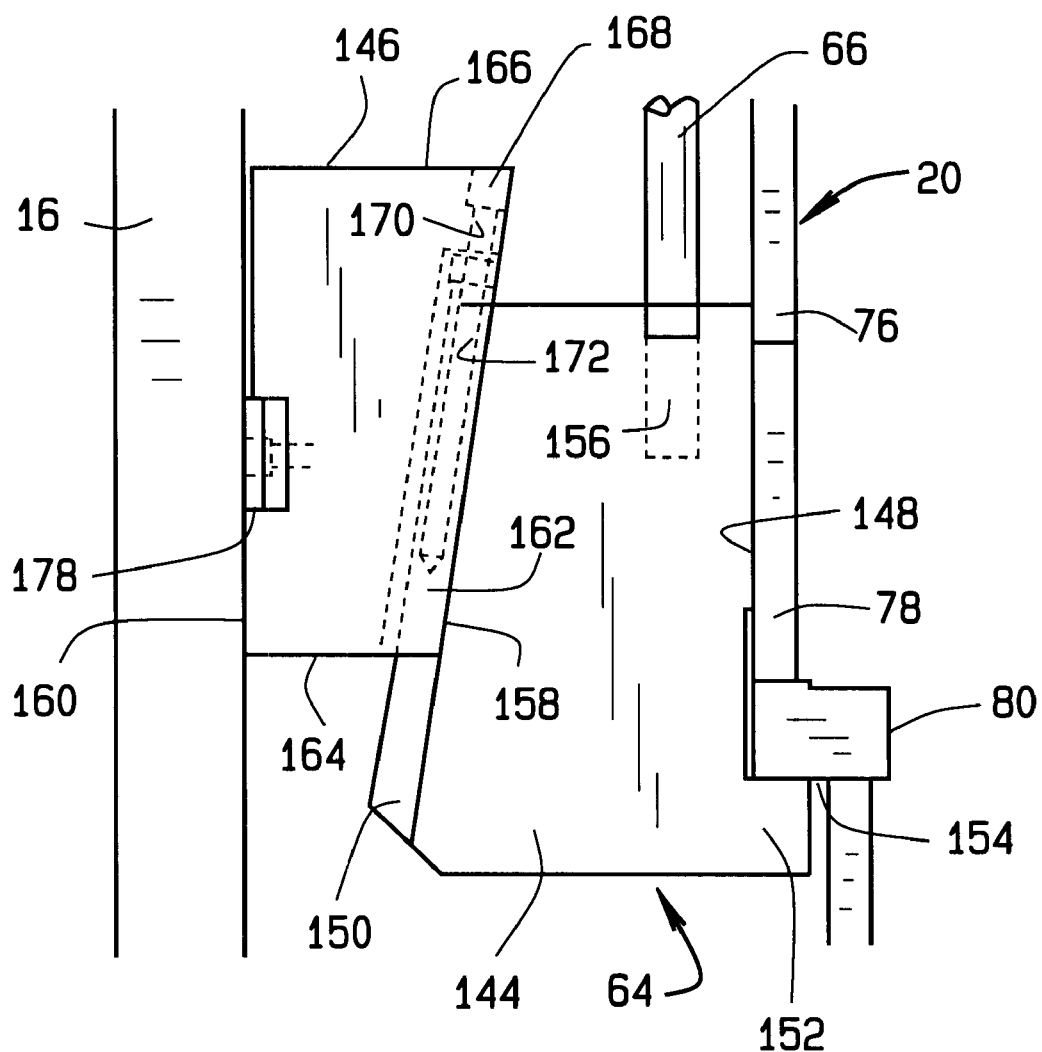
FIG. 7 is an enlarged side view of a lower portion of the shroud repair apparatus shown in FIG. 2.
Figure 8:
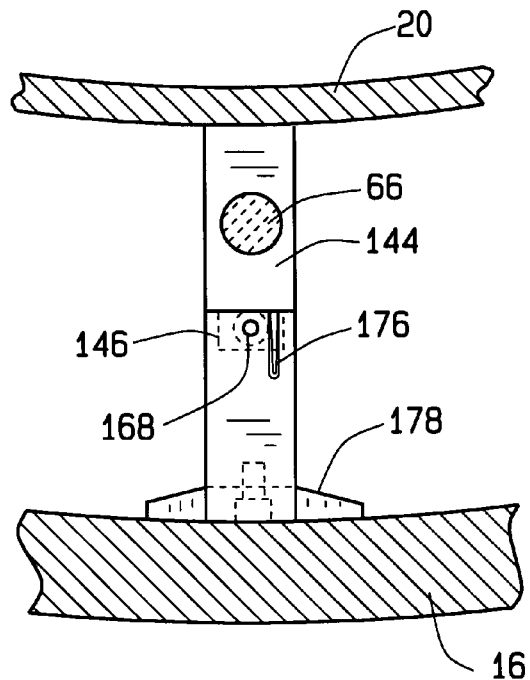
FIG. 8 is a top view of the lower stabilizer assembly of the shroud repair apparatus shown in FIG. 2.
Figure 9:
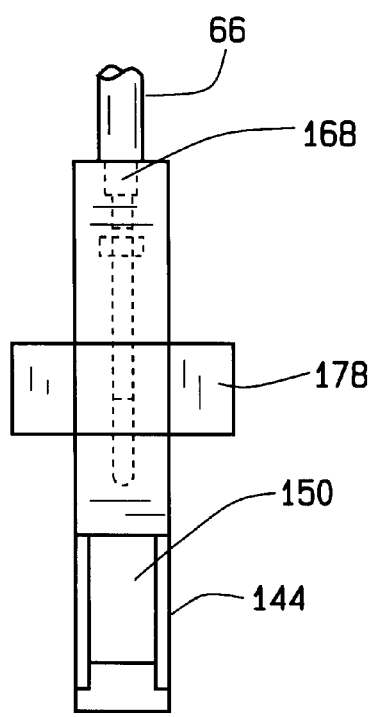
FIG. 9 is a front view of the lower stabilizer assembly of the shroud repair apparatus shown in FIG. 2.

Referring to FIGS. 7, 8, and 9, lower stabilizer assembly 64 includes a stabilizer block 144 and a lower stabilizer wedge 146 slidably coupled to lower stabilizer block 144. Lower stabilizer block 144 is configured to engage shroud 20. Particularly, lower stabilizer block 144 includes a first side 148, configured to engage shroud 20, and a tapered second side 150 configured to engage lower stabilizer wedge 146. A lip portion 152 extends from first side 148 of lower stabilizer block 144. Lip portion 152 is configured to engage a ledge 154 formed by core plate support 80. First side 148 is configured to engage mid shroud sections 76 and 78. Lower stabilizer block 144 also includes a threaded opening 156 sized to receive tie rod 66.

Lower stabilizer wedge 146 includes a tapered first side 158 and a second side 160. First side 158 includes a channel 162 sized to receive lower stabilizer block 144. Channel 162 extends from a first end 164 of wedge 146 at least partially towards a second end 166 of wedge 146.

Lower stabilizer assembly 64 further includes a jack bolt 168 extending through a jack bolt opening 170 in lower stabilizer wedge 146 and threadedly engaging a jack bolt opening 172 in lower stabilizer block 144. Lower stabilizer wedge jack bolt opening 170 extends from second end 166 of wedge 146 into channel 162. Lower stabilizer wedge 146 also includes a ratchet lock spring 176 configured to engage jack bolt 168 to maintain the tightness of jack bolt 168.

A horizontal stabilizing spring 178 is attached to second side 160 of wedge 146. Horizontal stabilizing spring 178 and second side 160 of wedge 146 is configured to engage side wall 16 of reactor pressure vessel 10. Horizontal stabilizing spring 178 maintains the orientation of lower stabilizer assembly 64 square to RPV side wall 16. Stabilizing spring 178 is sized to provide the same flexibility, preload, and clearance as integral leaf spring 140, described above, provides in upper stabilizer wedge 102.

Referring again to FIGS. 2 and 3, tie rod 66 is threaded at each end. A first end 180 threadedly engages threaded tie rod opening 156 in lower stabilizer block 144. A second end 182 is received by upper stabilizer block bore 118 and is secured by a tie rod nut 184. Tie rod nut 184 reacts the tie rod load against upper stabilizer block 100. In one embodiment, tie rod 66 is fabricated from Ni—Cr—Fe alloy X-750 steel. Tie rod 66 preload increases at operating temperatures due to the differential expansion between X-750 steel tie rod 66 and stainless steel shroud 20. With an X-750 tie rod 66, more thermal differential contraction of tie rod 66 is produced than needed for the desired operating preload. To compensate, a belleville spring washer 186 is positioned between tie rod nut 184 and the upper stabilizer block 100. Spring washer 186 deflects only slightly with the low mechanical installation preload, for example, 5000 pounds (2268 kg), but compresses additionally to seat flat against upper stabilizer block 100 under full thermal preload, for example 40,000 pounds (18,144 kg).

A limit stop 188 is attached near second end 182 of tie rod 66. Limit stop 188 includes shear pins 190 and 192 which fit mating holes 194 and 196 in upper stabilizer block first portion 106. Shear pins 190 and 192 provide a torque restraint for tie rod 66 when tightening tie rod nut 184 as well as a pinned anti-vibration connection to support tie rod 66 during operation. Limit stop 188 limits possible horizontal displacement of shroud section 74 if welds 88 and 90 fail.

Figure 10:
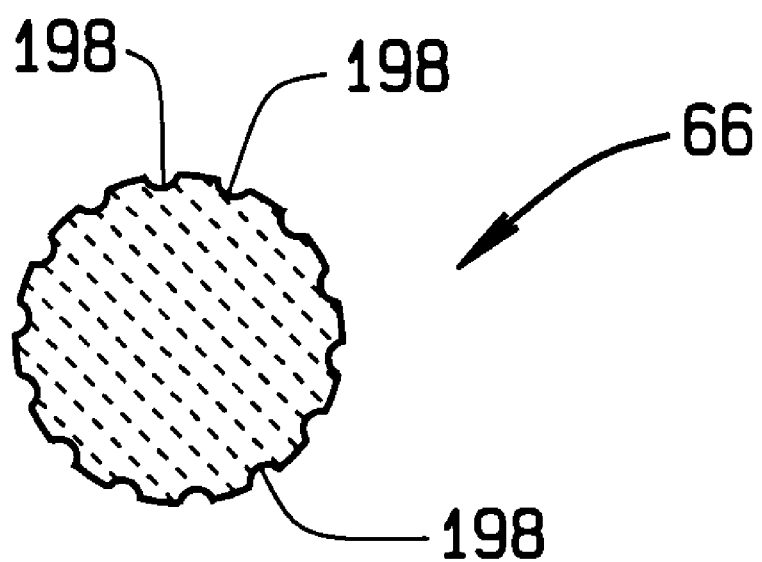
FIG. 10 is a cross sectional view of the tie rod of the shroud repair apparatus shown in FIG. 2, through line A—A.

In known shroud repair apparatus using tie rods, it is usually necessary to provide a mid support to increase the tie rod natural frequency to be sufficiently higher than the vortex shedding frequency due to annulus cross flow to avoid flow induced vibration (FIV) of the tie rod. Tie rod 66 includes a plurality of longitudinal grooves 198 spaced around the periphery of tie rod 66 to reduce the magnitude and frequency of the alternating flow forces, and thus eliminate the need for a mid support. Grooves 198 have the affect on the coolant cross flow stream of dividing cylindrical tie rod 66 into a number of smaller objects which reduces the vortex shedding frequency to a value which is a safe margin below the natural vibration frequency of tie rod 66. As a result, resonant excitation of tie rod 66 does not occur. Grooves 198 can be regularly or irregularly spaced. FIG. 10 shows grooves 198 irregularly spaced to interfere with cumulative resonant interaction of the flow vortices. Grooves 198 extend longitudinally along a central portion 200 of tie rod 66. Because the orientation of grooves 198 is parallel to tie rod 66 axial loading, grooves 198 produce no structural stress concentration in tie rod 66.

Figure 11:
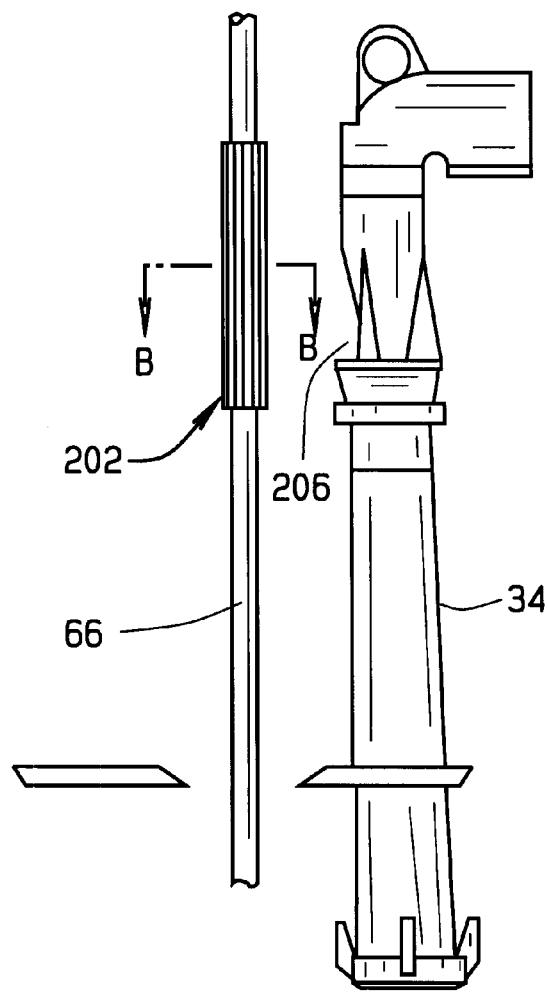
FIG. 11 is a side view of a tie rod of a shroud repair apparatus in accordance with another embodiment of the present invention.
Figure 12:
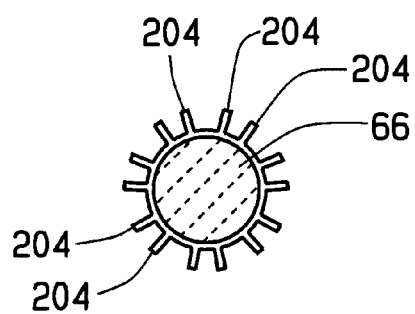
FIG. 12 is a cross sectional view of the tie rod shown in FIG. 11, through line B—B.

In another embodiment, as shown in FIGS. 11 and 12, grooves 198 are replaced by a sleeve 202 attached to tie rod 66. Longitudinal fins 204 project radially from sleeve 202 Sleeve 202 is positioned on tie rod 66 adjacent a suction inlet 206 of jet pump assembly 34, where cross flow velocity is high enough to cause concern for FIV of tie rod 66. The length of sleeve 202 is less than tie rod 66 because the anti FIV attribute that sleeve 202 imparts to tie rod 66 is needed only over a relatively short length of tie rod 66 which is in annulus 28 flow region near jet pump suction inlet 206. Sleeve 202 inhibits FIV by two means. First, the Strouhal number for the finned shape of sleeve 202 is lower than for a cylinder. Second, projecting fins 204 increase the characteristic diameter of tie rod 66 without addition of significant mass or machining over the remaining length of tie rod 66. Both of these effects directly reduce the vortex shedding frequency which provides a margin separating the excitation frequency from the higher natural frequency of tie rod 66.

The above described shroud repair apparatus 60 is quickly and easily installed in reactor pressure vessel 10 because it does not require any installation machining of existing reactor components. Lower stabilizer assembly 64 and tie rod 66 are pre-assembled with tie rod 66 threaded into lower stabilizer block 144. Tie rod 66 and lower stabilizer block 144 are then lowered into position in annulus 28 with lower stabilizer block 144 engaging protruding core plate support ledge 154. Lower stabilizer wedge 146 is then lowered into place on lower stabilizer block 144 and adjusted by tightening jack bolt 168. Ratchet lock spring 184 prevents jack bolt 168 from loosening.

Upper stabilizer assembly 62 is lowered into position in annulus 28 between shroud 20 and reactor pressure vessel outer wall 16, engaging tie rod 66 through bore 118 in upper stabilizer block 100. Slotted lug opening 116 at the top of upper stabilizer block 100 is then engaged onto a shroud lug pair 104. Belleville spring washer 186 and tie rod nut 184 is then lowered in place and tightened to tie rod 66 which causes lower stabilizer block 144 to seat against the bottom surface of shroud core plate support ledge 154. A ratchet lock spring (not shown) prevents tie rod nut 184 from loosening during reactor operation. Upper stabilizer wedge 102 is then lowered into position and adjusted by tightening jack bolt 132. Ratchet lock spring 138 prevents jack bolt 132 from loosening during reactor operation. Typically four repair apparatus 60, equally spaced around shroud 20, are installed in reactor pressure vessel 10 to repair cracked shroud welds 86, 88, 90, 92, and 94.

The above described shroud repair apparatus 60 does not require any installation machining of existing reactor components prior to installation, and therefore is quickly and easily installed in reactor pressure vessel 10. Repair apparatus provides lateral support for shroud 20 and imparts a clamping force to shroud 20 to maintain shroud joint integrity and overcome the effects of any stress corrosion cracking in circumferential shroud welds 86, 88, 90, 92, and 94.

Additionally, slotted lug opening 116 permits the use of the existing shroud lug T-bolt 117 attachment without significant additional loading. The normal upward load applied by existing shroud T-bolt 117 to lug 104 is about one half the new downward tie rod 66 preload, so the net operating load on lug 104 is not increased. Further, shroud T-bolt 117 contributes to the total available strength in the load path connecting to tie rod 66, which offers additional margin for higher LOCA accident condition pressure uplift loading.

While the invention has been described and illustrated in terms of various specific embodiments, those skilled in the art will recognize that the invention can be practiced with modification within the spirit and scope of the claims.

What is claimed is:

1. A repair apparatus for repairing a shroud in a nuclear reactor pressure vessel, the reactor pressure vessel comprising a core shroud having a plurality of shroud lugs around the circumference of a first end of the core shroud, a shroud support structure arranged to support the core shroud inside the reactor pressure vessel so that the shroud and a side wall of the reactor pressure vessel define an annulus therebetween, a second end of the shroud is coupled to the shroud support structure, said shroud repair apparatus comprising:
    an upper stabilizer assembly configured to couple to a shroud lug, said upper stabilizer comprising a stabilizer block and an upper stabilizer wedge slidably coupled to said upper stabilizer block;
    a lower stabilizer assembly, said lower stabilizer comprising a stabilizer block and an lower stabilizer wedge slidably coupled to said lower stabilizer block, said lower stabilizer block configured to engage the shroud; and
    a tie rod having an outer surface, said tie rod extending between and coupled at a first end to said upper stabilizer assembly and at a second end to said lower stabilizer assembly.

2. A repair apparatus in accordance with claim 1 wherein said upper stabilizer assembly further comprises a jack bolt, said jack bolt extending through a jack bolt opening in said upper stabilizer wedge and threadedly engaging a jack bolt opening in said upper stabilizer block.

3. A repair apparatus in accordance with claim 2 wherein said lower stabilizer assembly further comprises a jack bolt, said jack bolt extending through a jack bolt opening in said lower stabilizer wedge and threadedly engaging a jack bolt opening in said lower stabilizer block.

4. A repair apparatus in accordance with claim 3 wherein said upper stabilizer wedge and said lower stabilizer wedge each further comprise a ratchet lock spring configured to engage said corresponding jack bolt.

5. A repair apparatus in accordance with claim 1 wherein said lower stabilizer wedge further comprises a horizontal stabilizing spring configured to engage the side wall of the reactor pressure vessel.

6. A repair apparatus in accordance with claim 1 wherein said upper stabilizer wedge further comprises an integral leaf spring portion configured to engage the side wall of the reactor pressure vessel.

7. A repair apparatus in accordance with claim 1 wherein said tie rod is attached to said upper stabilizer block with a tie rod nut and a spring washer, said spring washer positioned between said tie rod nut and said upper stabilizer block.

8. A repair apparatus in accordance with claim 1 wherein said tie rod comprises a plurality of longitudinal grooves in said outer surface.

9. A repair apparatus in accordance with claim 1 wherein said tie rod comprises a sleeve attached to said tie rod outer surface, said sleeve comprising an outer surface having longitudinal fins, said sleeve covering at least a portion of said outer surface of said tie rod.

10. A repair apparatus in accordance with claim 1 wherein said tie rod further comprises a limit stop at said first end, said limit stop configured to engage the shroud, said limit stop comprising at least one shear pin configured to engage mating holes in a bottom surface of said upper stabilizer block.

11. A nuclear reactor pressure vessel comprising:
    a core shroud comprising a plurality of shroud lugs around the circumference of a first end of said core shroud;
    a shroud support structure arranged to support said core shroud inside said reactor pressure vessel so that said shroud and a side wall of said reactor pressure vessel define an annulus therebetween, a second end of said shroud is coupled to said shroud support structure; and
    at least one shroud repair apparatus positioned in said annulus, each said shroud repair apparatus comprising:
    an upper stabilizer assembly coupled to a shroud lug, said upper stabilizer comprising a stabilizer block and an upper stabilizer wedge slidably coupled to said upper stabilizer block;
    a lower stabilizer assembly, said lower stabilizer comprising a stabilizer block and an lower stabilizer wedge slidably coupled to said lower stabilizer block, said lower stabilizer block engaging said shroud; and
    a tie rod having an outer surface, said tie rod extending between and coupled at a first end to said upper stabilizer assembly and at a second end to said lower stabilizer assembly.

12. A nuclear reactor pressure vessel in accordance with claim 11 wherein said upper stabilizer assembly further comprises a jack bolt, said jack bolt extending through a jack bolt opening in said upper stabilizer wedge and threadedly engaging a jack bolt opening in said upper stabilizer block.

13. A nuclear reactor pressure vessel in accordance with claim 12 wherein said lower stabilizer assembly further comprises a jack bolt, said jack bolt extending through a jack bolt opening in said lower stabilizer wedge and threadedly engaging a jack bolt opening in said lower stabilizer block.

14. A nuclear reactor pressure vessel in accordance with claim 13 wherein said upper stabilizer wedge and said lower stabilizer wedge each further comprise a ratchet lock spring configured to engage said corresponding jack bolt.

15. A nuclear reactor pressure vessel in accordance with claim 11 wherein said lower stabilizer wedge further comprises a horizontal stabilizing spring configured to engage said side wall of said reactor pressure vessel.

16. A nuclear reactor pressure vessel in accordance with claim 11 wherein said upper stabilizer wedge further comprises an integral leaf spring portion configured to engage said side wall of said reactor pressure vessel.

17. A nuclear reactor pressure vessel in accordance with claim 11 wherein said tie rod is attached to said upper stabilizer block with a tie rod nut and a spring washer, said spring washer positioned between said tie rod nut and said upper stabilizer block.

18. A nuclear reactor pressure vessel in accordance with claim 11 wherein said tie rod comprises a plurality of longitudinal grooves in said outer surface.

19. A nuclear reactor pressure vessel in accordance with claim 11 wherein said tie rod comprises a sleeve attached to said tie rod outer surface, said sleeve comprising an outer surface having longitudinal fins, said sleeve covering at least a portion of said outer surface of said tie rod.

20. A nuclear reactor pressure vessel in accordance with claim 11 wherein said tie rod further comprises a limit stop at said first end, said limit stop configured to engage said shroud, said limit stop comprising at least one shear pin configured to engage mating holes in a bottom surface of said upper stabilizer block.

* * * * *